(12) United States Patent
He et al.

(10) Patent No.: US 8,007,935 B2
(45) Date of Patent: Aug. 30, 2011

(54) PLATE ASSEMBLY, CORE AND LITHIUM ION BATTERY

(75) Inventors: Long He, Shenzhen (CN); Xi Shen, Shenzhen (CN); Jianhua Zhu, Shenzhen (CN); Hongchi Gu, Shenzhen (CN)

(73) Assignee: BYD Co., Ltd., Shenzhen (CN)

( * ) Notice: Subject to any disclaimer, the term of this patent is extended or adjusted under 35 U.S.C. 154(b) by 0 days.

(21) Appl. No.: 12/307,098

(22) PCT Filed: Dec. 18, 2006

(86) PCT No.: PCT/CN2006/003469
§ 371 (c)(1),
(2), (4) Date: Dec. 30, 2008

(87) PCT Pub. No.: WO2008/052394
PCT Pub. Date: May 8, 2008

(65) Prior Publication Data
US 2009/0286153 A1 Nov. 19, 2009

(30) Foreign Application Priority Data

Oct. 30, 2006 (CN) .......................... 2006 1 0137917

(51) Int. Cl.
*H01M 2/14* (2006.01)
*H01M 2/18* (2006.01)
(52) U.S. Cl. ....................................... 429/131; 429/136
(58) Field of Classification Search .................. 429/185, 429/131, 136
See application file for complete search history.

(56) References Cited

U.S. PATENT DOCUMENTS

| 1,128,232 | A | * | 2/1915 | Davis ............................ 429/136 |
| 3,967,978 | A | * | 7/1976 | Honda et al. .................. 429/254 |
| 5,554,452 | A | * | 9/1996 | Delmolino et al. ............. 429/10 |
| 5,601,946 | A | * | 2/1997 | Hattori et al. ................. 429/206 |
| 6,377,432 | B1 | | 4/2002 | Hashimoto |
| 7,670,716 | B2 | * | 3/2010 | Aamodt et al. ............... 429/129 |
| 2002/0045091 | A1 | * | 4/2002 | Kamei et al. ................... 429/62 |
| 2002/0146620 | A1 | | 10/2002 | Connell |
| 2003/0134189 | A1 | | 7/2003 | Kanai et al. |

(Continued)

FOREIGN PATENT DOCUMENTS
CN 1185664 A 6/1998
(Continued)

*Primary Examiner* — Jennifer K. Michener
*Assistant Examiner* — Eli Mekhlin
(74) *Attorney, Agent, or Firm* — Brinks Hofer Gilson & Lione (57) ABSTRACT

Disclosed are a plate assembly for a battery, a core and a lithium ion battery. The plate assembly comprises a plate, a conductive terminal and a membrane bag, the plate is encapsulated in the membrane bag, an encapsulation line is formed when the membrane bag is encapsulated, and the conductive terminal is disposed at one end of the plate and protruded out of the membrane bag, wherein the encapsulation line has at least two loops around the periphery of the plate. The core comprises the plate assembly of the present invention. The lithium ion battery comprises the core of the present invention. Since the membrane bag included in the plate assembly of the present invention is encapsulated by at least two loops of encapsulation line around the periphery of the plate, the membrane bag can be encapsulated tightly, which can prevent effectively the membrane bag from being cracked, and prevent the short circuit from being occurred due to the contact of the positive and negative plates, and thereby effectively improves the mechanical impact resistance of the battery.

20 Claims, 4 Drawing Sheets

U.S. PATENT DOCUMENTS

| | | |
|---|---|---|
| 2005/0214634 A1 | 9/2005 | Kim |
| 2005/0238930 A1 | 10/2005 | Yoshida et al. |
| 2005/0277019 A1 | 12/2005 | Riley, Jr. et al. |
| 2006/0110657 A1 | 5/2006 | Stanton et al. |

FOREIGN PATENT DOCUMENTS

| | | |
|---|---|---|
| CN | 1241305 A | 1/2000 |
| CN | 2433734 Y | 6/2001 |
| CN | 1319901 A | 10/2001 |
| CN | 97117532.2 | 7/2002 |
| CN | 1442927 A | 9/2003 |
| CN | 97120801.8 | 12/2003 |
| CN | 1497753 A | 5/2004 |
| CN | 03103954.5 | 8/2004 |
| CN | 1540792 A | 10/2004 |
| CN | 2679860 Y | 2/2005 |
| CN | 1604357 A | 4/2005 |
| CN | 1610168 | 4/2005 |
| CN | 2704119 Y | 6/2005 |
| CN | 2717038 Y | 8/2005 |
| CN | 200420034061.1 | 8/2005 |
| CN | 200420026421.3 | 11/2005 |
| CN | 1716658 A | 1/2006 |
| CN | 1738096 A | 2/2006 |
| CN | 1750295 | 3/2006 |
| CN | 1773747 A | 5/2006 |
| CN | 1783576 A | 6/2006 |
| CN | 200520071106.7 | 7/2006 |
| CN | 1841820 A | 10/2006 |
| CN | 1841831 A | 10/2006 |
| CN | 1841834 A | 10/2006 |
| CN | 1855608 A | 11/2006 |
| CN | 2849999 Y | 12/2006 |
| CN | 1941458 A | 4/2007 |
| CN | 1949580 A | 4/2007 |
| CN | 1976095 Y | 6/2007 |
| CN | 101088192 A | 12/2007 |
| CN | 200993972 Y | 12/2007 |
| CN | 200510092257.5 | 2/2008 |
| EP | 1780819 A1 | 5/2007 |
| JP | 03127448 A * | 5/1991 |
| JP | 5-21086 | 1/1993 |
| JP | 7-169452 A | 7/1995 |
| JP | 11067278 A | 3/1999 |
| JP | 11-204130 A | 7/1999 |
| JP | 11-312512 A | 9/1999 |
| JP | 2001085042 A | 3/2001 |
| JP | 2001-126683 | 5/2001 |
| JP | 2001-283940 A | 10/2001 |
| JP | 2001338628 A | 12/2001 |
| JP | 2002-260745 A | 9/2002 |
| JP | 2002-329530 | 11/2002 |
| JP | 2006-173095 | 11/2002 |
| JP | 2003 168405 A | 6/2003 |
| JP | 2003288882 A | 10/2003 |
| JP | 2004-253262 | 9/2004 |
| JP | 2004-327311 | 11/2004 |
| JP | 2005-71640 A | 3/2005 |
| JP | 2005-190885 | 7/2005 |
| JP | 2005-251617 | 9/2005 |
| JP | 2006-79960 A | 3/2006 |
| JP | 2006-294531 A | 10/2006 |
| JP | 2007-194035 A | 8/2007 |
| JP | 2008-123800 | 5/2008 |
| JP | 2008-181765 | 8/2008 |
| JP | 2008-181822 | 8/2008 |
| WO | WO 2005/013408 A1 | 2/2005 |
| WO | WO 2005013408 A1 * | 2/2005 |
| WO | WO 2008/144994 A1 | 12/2008 |

\* cited by examiner

PLATE ASSEMBLY, CORE AND LITHIUM ION BATTERY

The present application is the national phase application of PCT Application No. PCT/CN2006/003469, filed Dec. 18, 2006, which claims priority to Chinese Patent Application No. 200610137917.1, filed Oct. 30, 2006, the entireties of both of which are hereby incorporated by references.

FIELD OF THE INVENTION

The present invention relates generally to the field of battery, and more particularly, to a plate assembly for a battery, a core comprising such a plate assembly, and a lithium ion battery comprising such a core.

BACKGROUND OF THE INVENTION

Conventionally, a prismatic lithium ion battery mainly comprises a battery shell and a core having a positive plate, a negative plate and a membrane. As for a lithium ion battery being relatively small in structure and not high in capacity, the core thereof often adopts the winding structure. The process for manufacturing a core with the winding structure is relatively easy and convenient, but it is not suitable for manufacturing an over-thin lithium ion battery or a large lithium ion battery which has a high capacity and a high output power, due to the big difficulty in winding operation. On the contrary, a core with the laminated structure is widely used, because it is suitable for manufacturing various kinds of lithium ion batteries with various capacities. The so-called "laminated structure" means that the positive plate covered with the membrane and the negative plate are laminated alternately, or the positive plate and the negative plate covered with the membrane are laminated alternately, or the positive plate covered with the membrane and the negative plate covered with the membrane are laminated alternately, so as to form the core.

Figure 1:
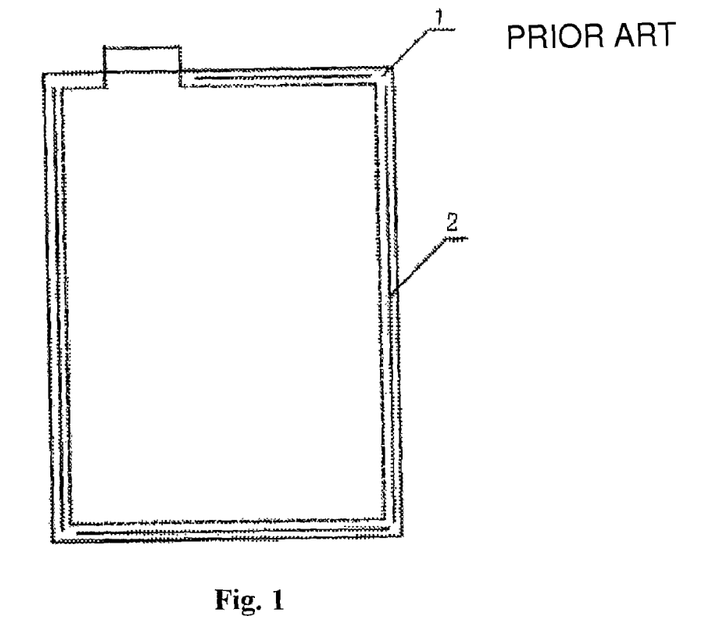
FIG. 1 is a schematic view showing the structure of a membrane bag of a conventional lithium ion battery.

CN 2717037 Y discloses a lithium ion battery comprising a core with the laminated structure, wherein the battery comprises a core, a shell, a positive pole and a negative pole. The core is located in a space defined by the shell. The positive pole and the negative pole are disposed on the shell respectively. The core comprises a positive plate, a negative plate, a positive conductive terminal, a negative conductive terminal and a membrane bag 1. The positive plate and the negative plate are encapsulated within the membrane bag 1 respectively, and a loop of wide welding line 2 surrounding the plate is formed when the membrane bag 1 is encapsulated. The positive conductive terminal and the negative conductive terminal are disposed on an end of the positive plate and the negative plate respectively, and protrude outwardly from the membrane bag 1 to be connected with the positive pole and the negative pole. The membrane bags 1 having the positive plates encapsulated therein and the membrane bags 1 having the negative plates encapsulated therein are laminated alternately. As shown in FIG. 1, the wide welding line 2 is disposed along the periphery of the membrane bag 1 which is almost sealed closely. However, such a battery has the following disadvantages.

(1). The welding line may be cracked when a force is applied to the battery due to an impact such as falling down and shaking of the battery. Once the welding line is cracked, the plate may flee outwardly from the cracked opening, such that the positive plate and the negative plate may be damaged or contacted each other, which may produce a short circuit in the battery, and thereby causes a series of safety risks such as heating and explosion.

(2). Since the periphery of the membrane bag 1 is almost closely sealed, it is very difficult for the air in the membrane bag 1 to be released during the process of laminating the core. Therefore, it is difficult to laminate and press the core tightly, which may cause over thick of the core, and produce difficulty for encapsulating the core with the shell, and damage the core.

(3). Generally, the welding line 2 has a width of 2-3 mm. Because the width is big, in the process of welding, the membrane has a big area to be heated and a big shrinking appears due to the heat, such that the membrane bag 1 is easy to be rumpled and warped at the periphery thereof, and further causes the misalignment of laminating the positive plates and the negative plates, which will thereby cause safety risks to the core.

SUMMARY OF THE INVENTION

One object of the present invention is to provide a plate assembly for a battery which has an excellent mechanical impact resistance. Another object of the present invention is to provide a core comprising such a plate assembly. A further object of the present invention is to provide a lithium ion battery comprising such a core.

The plate assembly of the present invention comprises a plate, a conductive terminal and a membrane bag. The plate is encapsulated in the membrane bag, an encapsulation line is formed when the plate is encapsulated. The conductive terminal is disposed at one end of the plate and protruded out of the membrane bag, wherein the encapsulation line has at least two loops around the periphery of the plate.

The core of the present invention comprises a positive plate assembly and/or a negative plate assembly, wherein the positive plate assembly and a negative plate are laminated alternately, or the negative plate assembly and a positive plate are laminated alternately, or the positive plate assembly and the negative plate assembly are laminated alternately. The positive plate assembly and the negative plate assembly are the plate assembly provided by the present invention.

The lithium ion battery of the present invention comprises a core, an electrolyte, a shell, a positive pole and a negative pole, the core and the electrolyte are sealed in the shell, the positive pole and the negative pole are disposed on the shell and connected to the core respectively, wherein the core is the core provided by the present invention.

The battery provided by the present invention has the following advantages:

(1). Since there are a plurality of loops of the encapsulation line formed on the membrane bag, the problem of short circuit in the battery, which is caused by the plate fleeing out through the crack opening when the welding line partially cracks due to an uncertain exterior force applied to the battery in the prior art, can be solved effectively. Even though a loop of the encapsulation line cracks, the other loops of the encapsulation line can also prevent the plate fleeing out, which acts more protection functions, and enhance the mechanical impact resistance of the battery.

(2). Since each loop of the encapsulation line also has an air release gap, the air in the membrane bag can be discharged out easily during the laminating of the core, and thereby the problem in the prior art that the core may be over thick and it is difficult to assemble a battery and even the core may be cracked can be solved. Therefore, the rate of finished product can be improved and the manufacture cost can be lowered.

(3). Since the encapsulation line has a smaller width, the membrane bag has small deformations at the welding line due to heat generated by welding, and thereby the flatness of the membrane bag, the neatness of the laminated core and the quality of the core are improved.

DETAILED DESCRIPTION OF THE PREFERRED EMBODIMENTS

Hereinafter, the present invention will be described in detail in conjunction with the accompanying drawings.

Figure 2:
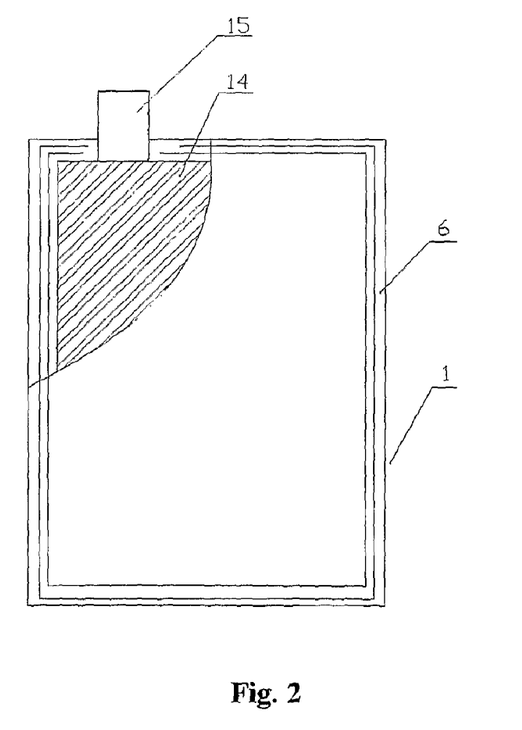
FIG. 2 is a schematic view showing the structure of a plate assembly of the present invention.

As shown in FIG. 2, the plate assembly of the present invention comprises a plate 14, a conductive terminal 15 and a membrane bag 1, the plate 14 is encapsulated in the membrane bag 1, an encapsulation line 6 is formed when the membrane bag 1 is encapsulated, the conductive terminal 15 is disposed at one end of the plate 14 and protruded out of the membrane bag 1, wherein the encapsulation line 6 has at least two loops around the periphery of the plate 14.

In order to prevent the plate 14 from fleeing around in the membrane bag 1, preferably, the encapsulation line 6 is formed on the membrane bag 1 at the position corresponding to the periphery of the encapsulated plate 14.

The encapsulation line 6 has at least two loops. In order to encapsulate the membrane bag 1 firmly, and at the same time to increase the productivity of the plate assembly, preferably, the encapsulation line 6 has 2-4 loops.

The encapsulation line 6 can be disposed freely at the edge of the membrane bag 1. However, in order to increase the productivity and simplify the process, preferably, the different loops of the encapsulation line 6 are parallel to each other, and more preferably, the distance between two neighboring loops of the encapsulation line 6 is 0.1-5 mm, and more preferably is 1-3 mm.

Figure 3:
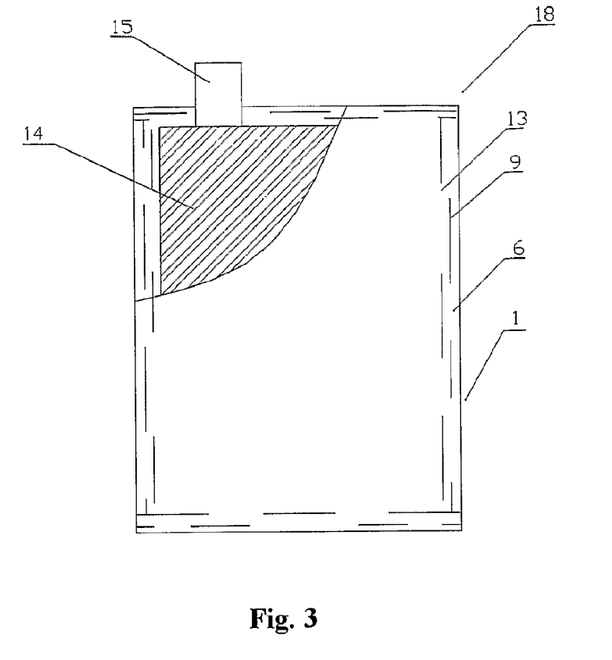
FIG. 3 is a schematic view showing the structure of a plate assembly of the present invention.

In order to discharge out the air in the membrane bag 1 conveniently during the process of laminating the core, and thereby simplify the assemble of the battery, as shown in FIG. 3, preferably, each loop of the encapsulation line 6 comprises a short encapsulation line 9 and an air release gap 13, which are arranged alternately.

Figure 4:
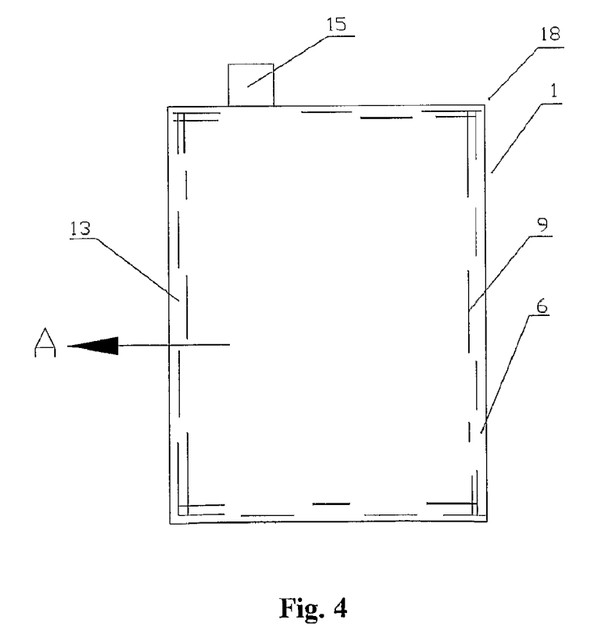
FIG. 4 is a schematic view showing the structure of a plate assembly of the present invention.

The encapsulation line 6 may be arranged in a completely staggered manner, as shown in FIG. 4. The so called "completely staggered arrangement manner" refers to that all the air release gaps 13 in one loop of the encapsulation line 6 are at least partially communicated directly with all the air release gaps 13 in the other loops of the encapsulation line 6 in the direction perpendicular to the encapsulation line 6, as shown by the arrow A, except the encapsulation line 6 at the corners 18 of the membrane bag 1 and the conductive terminal 15. Such an arrangement manner of the encapsulation line 6 can allow the membrane bag 1 to have better air permeability, such that the air in the membrane bag 1 can be discharged out more easily and timely, and thereby the assembled core is small in volume and can be easily assembled into the shell.

Figure 5:
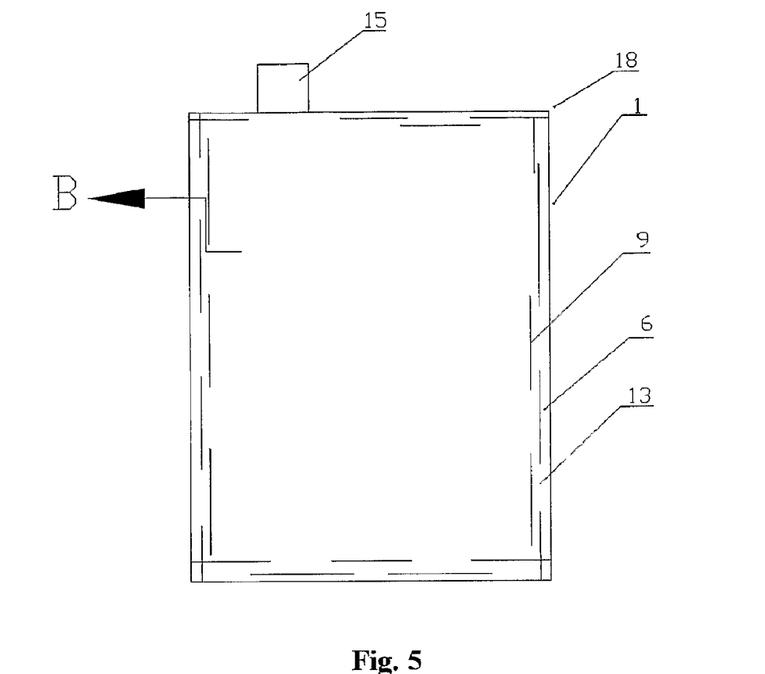
FIG. 5 is a schematic view showing the structure of a plate assembly of the present invention.

The encapsulation line 6 may also be arranged in a non-staggered manner, as shown in FIG. 5. The so called "non-staggered arrangement manner" refers to that all the air release gaps 13 in one loop of the encapsulation line 6 are not directly communicated with all the air release gaps 13 in the other loops of the encapsulation line 6 in the direction perpendicular to the encapsulation line 6, as shown by the arrow B, except the encapsulation line 6 at the corners 18 of the membrane bag 1 and the conductive terminal 15. Such an arrangement manner of the encapsulation line 6 can allow the encapsulation of the membrane bag 1 to be harder, and the membrane bag 1 is not easy to be cracked.

Figure 6:
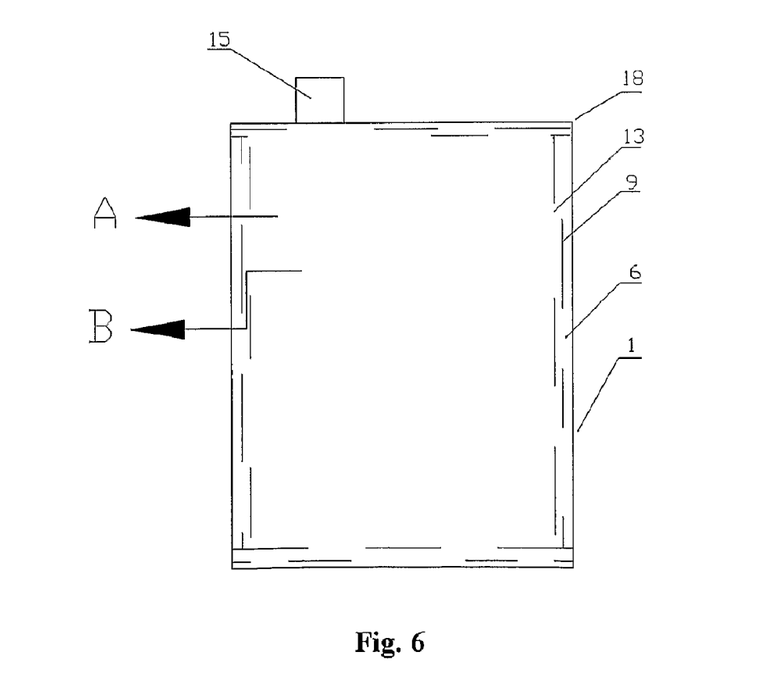
FIG. 6 is a schematic view showing the structure of a plate assembly of the present invention.

The encapsulation line 6 may also be arranged in a partial-staggered manner, as shown in FIG. 6. The so called "partial-staggered arrangement manner" refers to that a part of the air release gaps 13 in one loop of the encapsulation line 6 are at least partially communicated directly with a part of the air release gaps 13 in the other loops of the encapsulation line 6 in the direction perpendicular to the encapsulation line 6, except the encapsulation line 6 at the corners 18 of the membrane bag 1 and the conductive terminal 15. Such an arrangement manner of the encapsulation line 6 can allow the encapsulation of the membrane bag 1 to be harder, and the membrane bag 1 is not easy to be cracked, and at the same time, it can allow the membrane bag 1 to have better air permeability, such that the air in the membrane bag 1 can be discharged out more easily and timely, and thereby the assembled core is small in volume and can be easily assembled into the shell.

In order that the membrane bag 1 has both a harder encapsulation and good air permeability, the partial-staggered arrangement manner is preferably used. More preferably, the size of the directly communicated part formed by the air release gaps 13 of different loops along the length direction of the encapsulation line 6 is 0.1-5 mm.

The rectangular corners of the plate 14 may puncture the membrane bag 1, which may result the plate 14 flee out from the punctured portion, make the positive and negative plates contact each other, and thereby make a short circuit in the battery. Therefore, in order to prevent the rectangular corners of the plate 14 from puncturing the membrane bag 1, preferably, at least two short encapsulation lines 9 are provided at the corner 18 of the membrane bag 1, and are intersect each other; and more preferably, at least two short encapsulation lines 9 are provided at the corner 18 of the membrane bag 1, and are intersect perpendicularly each other. Some arrangement manners of the short encapsulation lines 9 at each corner 18 of the membrane bag 1 are shown in FIGS. 4-6. As shown in FIG. 4, four short encapsulation lines 9 are provided at each corner 18 of the membrane bag 1, two of which are parallel to one side of the membrane bag 1, and the other two are perpendicular to the one side of the membrane bag 1. The two short encapsulation lines 9 parallel to one side of the membrane bag 1 and the two short encapsulation lines 9 perpendicular to the one side of the membrane bag 1 are intersect perpendicularly. As shown in FIG. 5, two short encapsulation lines 9 are provided at each corner 18 of the membrane bag 1, one of which is parallel to one side of the membrane bag 1, and the other one is perpendicular to the one side of the membrane bag 1. The one short encapsulation line 9 parallel to one side of the membrane bag 1 and the one short encapsulation line 9 perpendicular to the one side of the membrane bag 1 are intersect perpendicularly. As shown in FIG. 6, three short encapsulation lines 9 are provided at each corner 18 of the membrane bag 1, one of which is parallel to one side of the membrane bag 1, and the other two are perpendicular to the one side of the membrane bag 1. The one short encapsulation line 9 parallel to one side of the membrane bag 1 and one of the two short encapsulation lines 9 perpendicular to the one side of the membrane bag 1 are intersect perpendicularly.

The short encapsulation lines 9 may be formed by any known manners in this field, such as welding, bonding or pressing, and the welding is preferable. The welding manner may be electric heating soldering, high cycle welding, ultrasonic welding or laser welding, and the electric heating soldering or the high cycle welding is preferable.

When a welding manner is used to form the short encapsulation line 9, in order to prevent the membrane bag 1 from ruffling and warping due to the big heated area, the short encapsulation line 9 shall not be too wider, and preferably, the width of the short encapsulation line 9 is 0.3-1.5 mm, and 0.5-1 mm is more preferable. The width of the short encapsulation line 9 means the distance between two edges of the short encapsulation line 9 in the direction perpendicular to the short encapsulation line 9.

In order to make the membrane bag 1 be hard and have good air permeability, the length of each short encapsulation line 9 is 5-50% of the length of each loop of the encapsulation line 6, and the length of each air release gap 13 is 5-50% of the length of each loop of the encapsulation line 6.

The shape and size of the membrane bag 1 match that of the plate 14. Preferably, the shape of the membrane bag 1 is the same with that of the plate 14, and the size of the membrane bag 1 is bigger than that of the plate 14. And more preferably, the size of the membrane bag 1 is bigger at 4-10 mm than that of the plate 14.

Figure 7:
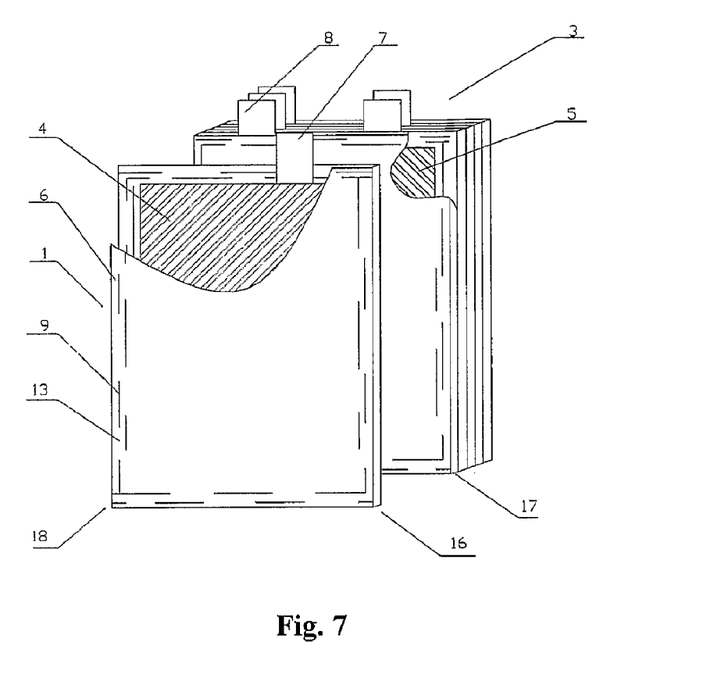
FIG. 7 is a schematic view showing the structure of a core of the present invention.

As shown in FIG. 7, the core of the present invention comprises a positive plate assembly 16 and/or a negative plate assembly 17, wherein the positive plate assembly 16 is laminated alternately with a negative plate, or the negative plate assembly 17 is laminated alternately with a positive plate, or the positive plate assembly 16 is laminated alternately with the negative plate assembly 17. The positive plate assembly 16 and the negative plate assembly 17 are the plate assembly provided by the present invention.

The positive plate assembly 16 comprises a positive plate 4, a positive conductive terminal 7 and a membrane bag 1. The negative plate assembly 17 comprises a negative plate 5, a negative conductive terminal 8 and a membrane bag 1. The positive plate 4 and the negative plate 5 are encapsulated within the membrane bags 1 respectively, and the encapsulation lines 6 are formed when the membrane bags 1 are encapsulated. The positive and negative conductive terminals 7 and 8 are disposed at one end of the positive and negative plates 4 and 5 respectively and protruded out of the membrane bags 1. Wherein, the encapsulation lines 6 each are formed at least two loops around the peripherals of the positive plate 4 and the negative plate 5.

When the core is laminated, in order to prevent the positive conductive terminal 7 and the negative conductive terminal 8 from contacting with each other, the positive and negative conductive terminals 7 and 8 of the neighboring positive and negative plates 4 and 5 are disposed at different ends of the positive and negative plates 4 and 5 respectively. For example, they may be disposed at the left end and the right end, or the upper end and the lower end of the positive and negative plates 4 and 5 respectively.

Figure 8:
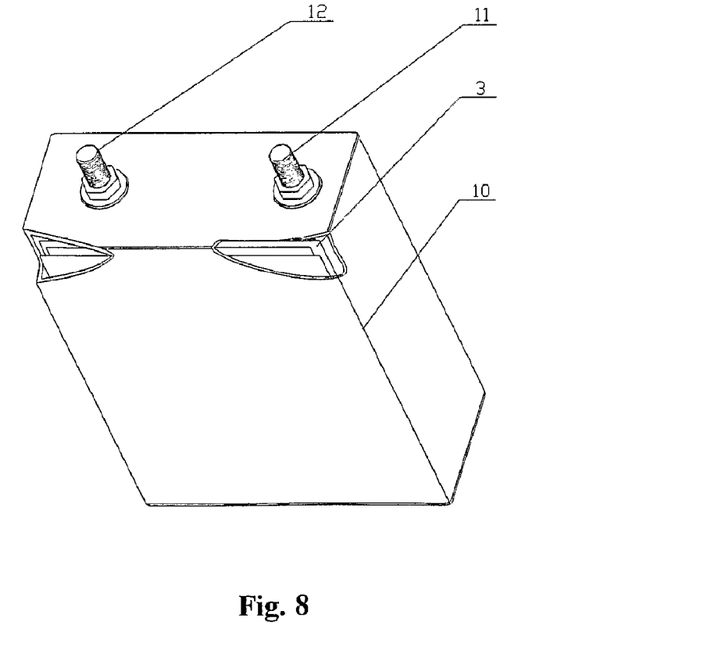
FIG. 8 is a schematic view showing the structure of a lithium ion battery of the present invention.

As shown in FIG. 8, a lithium ion battery according to one embodiment of the present invention comprises a core 3, an electrolyte (not shown), a shell 10, a positive pole 11 and a negative pole 12, the core 3 and the electrolyte are sealed within the shell 10, the positive pole 11 and the negative pole 12 each are disposed on the shell 10 and connected with the core 3, wherein the core 3 is the core provided by the present invention.

The core 3 comprises a positive plate assembly 16 and/or a negative plate assembly 17, wherein the positive plate assembly 16 and a negative plate are laminated alternately, or a positive plate and the negative plate assembly 17 are laminated alternately, or the positive plate assembly 16 and the negative plate assembly 17 are laminated alternately. The positive plate assembly 16 and the negative plate assembly 17 are the plate assembly provided by the present invention.

The positive plate assembly 16 comprises a positive plate 4, a positive conductive terminal 7 and a membrane bag 1. The negative plate assembly 17 comprises a negative plate 5, a negative conductive terminal 8 and a membrane bag 1. The positive plate 4 and the negative plate 5 are encapsulated within the membrane bags 1 respectively, and the encapsulation lines 6 are formed when the membrane bags 1 are encapsulated. The positive and negative conductive terminals 7 and 8 are disposed at one end of the positive and negative plates 4 and 5 respectively and protruded out of the membrane bags 1. The positive pole 11 is connected with the positive conductive terminal 7 of the positive plate assembly 16 or the conductive terminal of the positive plate. The negative pole 12 is connected with the negative conductive terminal 8 of the negative plate assembly 17 or the conductive terminal of the negative plate. Wherein, the encapsulation lines 6 each are formed at least two loops around the peripherals of the positive plate 4 and the negative plate 5.

According to the lithium ion battery of the present invention, the other structures of the lithium ion battery are the same with the structures of a common lithium ion battery.

The positive plate 4 may be obtained on the market, or manufactured by a known method in this field. The composition of the positive plate 4 is well known to a person skilled in this field. Generally, a positive plate 4 comprises a cathode current collector and a cathode material coated on and/or filled in the cathode current collector. The cathode material may contain a cathode active substance, a conductive additive and an adhesive.

The cathode active substance is not specially limited and may be the conventional cathode active substance able to reversibly intercalate and de-intercalate lithium ion in the art. Preferably, the cathode active substance is one or more selected from $Li_xNi_{1-y}CoO_2$ (wherein $0.9 \leq x \leq 1.1$ and $0 \leq y \leq 1.0$), $Li_{1+a}M_bMn_{2-b}O_4$ (wherein $-0.1 \leq a \leq 0.2$, $0 \leq b \leq 1.0$, and M is one of lithium, boron, magnesium, aluminum, titanium, chromium, iron, cobalt, nickel, copper, zinc, gallium, yttrium, fluorine, iodine and sulfur), and $Li_mMn_{2-n}B_nO_2$ (wherein B is a transition metal, $0.9 \leq m \leq 1.1$ and $0 \leq n \leq 1.0$).

Said conductive additive is not specially limited and may be a conventional cathode conductive additive of the art, such as one or more of acetylene black, conductive carbon black, and conductive graphite. The conductive additive is ranging from 1% to 15% by weight, and preferably from 2% to 10% by weight, based on the weight of the cathode active substance.

The species and content of said adhesive are known to the person skilled in the art. For example, said adhesive may be one or more of fluorine-containing resins and polyolefin compounds such as polyvinylmetadifluoride (PVDF), polyterafluoroethylene (PTFE) and styrene-butadiene rubber (SBR). Generally, according to the species of the adhesive used, the content of said adhesive is ranging from 0.01% to 8% by weight, and preferably from 0.02% to 5% by weight, based on the weight of the cathode active substance.

The cathode current collector may be a conventional cathode current collector in the lithium ion battery such as the aluminum foil that can be used as the cathode current collector of the present invention.

The process for preparing the positive plate may be the conventional process known to the person skilled in the art. For example, it may comprise mixing an cathode active substance, a conductive additive, and an adhesive with a solvent to prepare a mixture, coating the mixture on and/or filling the mixture in a current collector, drying and optionally rolling the resulted current collector to obtain said positive plate. Wherein said solvent may be one or more selected from N-dimethylpyrrolidone (NMP), N,N-dimethyl formamide (DMF), N,N-diethyl formamide (DEF), dimethyl sulfoxide (DMSO), tetrahydrofuran (THF), water and alcohols. The amount of the solvent is selected such that said slurry possesses viscosity and flowability and can be coated on said current collector. Generally, based on the weight of the cathode active substance, the content of said solvent is 5-70% by weight, and preferably 15-60% by weight. The methods and conditions of drying and rolling are known to the person skilled in the art.

The negative plate may be obtained on the market, or manufactured by a known method in this field. The composition of the negative plate is well known to a person skilled in this field. Generally, a negative plate comprises a anode current collector and a anode material coated on and/or filled in the anode current collector. The anode material may contain a anode active substance, a conductive additive and an adhesive.

Said anode active substance is not specially limited and may be any conventional anode active substance able to reversibly intercalate and de-intercalate lithium ion, such as one or more of natural graphite, synthetic graphite, petroleum coke, organic cracked carbon, mesophase carbon micro sphere, carbon fiber, tin alloy, and silicon alloy, with natural graphite being preferred.

The species and content of said adhesive are known to the person skilled in the art. For example, said adhesive may be one or more of fluorine-containing resins and polyolefin compounds such as polyvinylmetadifluoride (PVDF), polyteraflu­oroethylene (PTFE) and styrene-butadiene rubber (SBR). Generally, based on weight of the anode active substance, the content of said adhesive may be vary from 0.01% to 8% by weight, preferably from 0.02% to 5% by weight.

Said conductive additive is not specially limited and may be a conventional anode conductive additive of the art, such as one or more of acetylene black, conductive carbon black, and conductive graphite. The conductive additive is ranging from 1% to 15% by weight, and preferably from 2% to 10% by weight, based on the weight of the anode active substance.

The anode current collector may be a conventional anode current collector in the lithium ion battery such as the copper foil that can be used as the anode current collector of the present invention.

Said process for preparing the negative plate may be the conventional process known to the person skilled in the art. For example, it may comprise mixing a anode active substance, a conductive additive, and an adhesive with a solvent to prepare a mixture, coating the mixture on and/or filling the mixture in a current collector, drying and optionally rolling the resulted current collector to obtain said anode. Wherein said solvent may be one or more selected from N-dimethylpyrrolidone (NMP), N,N-dimethyl formamide (DMF), N,N-diethyl formamide (DEF), dimethyl sulfoxide (DMSO), tetrahydrofuran (THF), water and alcohols, and when said adhesive is a water-soluble adhesive, said solvent is preferably water. The amount of the solvent is such that said slurry possesses viscosity and flowability and can be coated on said current collector. Generally, the content of said solvent is 100-150% by weight based on the weight of the anode active substance. The methods and conditions of drying and rolling are known to the person skilled in the art.

Said electrolyte is not specially limited and may be a conventional nonaqueous electrolyte or a gelled-electrolyte. The nonaqueous electrolyte comprises lithium salt as electrolyte and a non-aqueous solvent. For example, the electrolyte lithium salt is one or more selected from lithium hexafluorophosphate (LiPF$_6$), lithium perchlorate, lithium tetrafluoroborate, lithium hexafluoroarsenate, lithium halide, lithium chloroaluminate and lithium fluorohydrocarbylsulphonate. The organic solvent is a mixed solvent of a chain ester and a cyclic ester, wherein the chain ester is at least one of dimethyl carbonate (DMC), diethyl carbonate (DEC), methylethyl carbonate (EMC), methylpropyl carbonate (MPC), dipropyl carbonate (DPC), and other chain organic esters comprising fluorine, sulfur or unsaturated bonds; and the cyclic ester may be at least one of ethenyl carbonate (EC), propenyl carbonate (PC), vinylidene carbonate (VC), γ-butyrolactone (γ-BL), sultone, and other cyclic organic esters comprising fluorine, sulfur or unsaturated bonds. The amount of the electrolyte is generally 1.5-8.0 g/Ah, and the concentration thereof is generally 0.5-2.9 mol/l.

Said membrane may be various common-used membrane in this field, such as the polyethylene ion exchange membrane, the polypropylene ion exchange membrane, or the composite ion exchange membrane of polypropylene and polyethylene.

The present invention will be described in detail through the following exemplified examples.

Example 1

This example shows the core of the present invention.

The core as shown in FIG. 7 is manufactured. This core comprises a positive plate assembly 16 and a negative plate assembly 17.

(1) The Preparation of the Positive Plate Assembly 16

1000 g LiCoO$_2$ as the cathode active substance, 30 g PVDF as the adhesive and 50 g conductive acetylene black were added into 600 g solvent NMP to prepare a mixture, and then stirred the mixture in a vacuum stirring machine to form a stable and uniform dispersion cathode slurry. An aluminum foil (width of 500 mm and thickness of 20 μm) at both sides was uniformly and intermittently coated with the above slurry and then dried at 120° C., rolled with a rolling mill to be a plate having the thickness of 120 μm, and punched with a punch to prepare the positive plate 4 having the length of 200 mm, the width of 150 mm and the thickness of 120 μm, and the positive conductive terminal 7 having the length of 30 mm and the width of 15 mm. The content of LiCoO$_2$ as the cathode active substance in the positive plate 4 is 10 g. The positive conductive terminal 7 and the positive plate 4 are formed integrally. The positive conductive terminal 7 is located at one side of one end of the positive plate 4.

A polypropylene ion exchange membrane having the thickness of 20 μm was cut into pieces having the length of 210 mm and the width of 160 mm to prepare the membrane used in the present example. The positive plate 4 is sandwiched between two layers of the membranes, such that the longer side of the positive plate 4 is parallel with the longer side of the membrane, the shorter side of the positive plate 4 is parallel with the shorter side of the membrane. And then the membrane is welded by the manner of high cycle welding at the edge of the positive plate 4 to form a membrane bag 1, such that the positive conductive terminal 7 is protruded out of the membrane 1 to prepare the positive plate assembly 16. By the welding, two loops of encapsulation line 6 are formed around the peripheral of the positive plate 4 at the edge of the membrane bag 1, different loops of the encapsulation line 6 are parallel with each other, and the distance between the two loops is 2 mm. The encapsulation line 6 includes a plurality of short encapsulation lines 9 and a plurality of air release gaps 13 arranged alternately each other. The short encapsulation line 9 has the length of 40 mm and the width of 1 mm. The air release gap 13 has the length of 40 mm. The encapsulation line 6 is arranged in the partial-staggered manner, the directly communicated portions and the indirectly communicated portions formed by the air release gaps 13 are arranged alternately. The directly communicated portions formed by the air release gaps 13 each have the size of 2 mm along the length direction of the encapsulation line 6. At the same time, the membrane bag 1 at each corner 18 has three short encapsulation lines 9, one of which is parallel with one side of the membrane bag 1, and the other two of which are perpendicular to this side of the membrane bag 1. The short encapsulation line 9 which is parallel with one side of the membrane bag 1 is crossed perpendicularly with one of the other two short encapsulation lines which are perpendicular to the side of the membrane bag 1.

(2) The Preparation of the Negative Plate Assembly 17

1500 g natural graphite as the anode active substance and 90 g PTFE as the adhesive were added into de-ionized water as the solvent to prepare a mixture, and then stirred the mixture in a vacuum stirring machine to form a stable and uniform dispersion anode slurry. A copper foil (width of 550 mm and thickness of 12 µm) at both sides was uniformly and intermittently coated with the above slurry and then dried at 120° C., rolled with a rolling mill to be a plate having the thickness of 120 µm, and punched with a punch to prepare the negative plate 5 having the length of 205 mm, the width of 155 mm and the thickness of 120 µm, and the negative conductive terminal 8 having the length of 30 mm and the width of 15 mm. The content of the natural graphite as the anode active substance in the negative plate 5 is 5 g. The negative conductive terminal 8 and the negative plate 5 are formed integrally. The negative conductive terminal 8 is located at one side of one end of the negative plate 5.

A polypropylene ion exchange membrane having the thickness of 20 µm was cut into pieces having the length of 215 mm and the width of 165 mm to prepare the membrane used in the present example. The negative plate 5 is sandwiched between two layers of the membranes, such that the longer side of the negative plate 5 is parallel with the longer side of the membrane, the shorter side of the negative plate 5 is parallel with the shorter side of the membrane. And then the membrane is welded by the manner of high cycle welding at the edge of the negative plate 5 to form a membrane bag 1, such that the negative conductive terminal 8 is protruded out of the membrane 1 to prepare the negative plate assembly 17. By the welding, two loops of encapsulation line 6 are formed around the peripheral of the negative plate 5 at the edge of the membrane bag 1, different loops of the encapsulation line 6 are parallel with each other, and the distance between the two loops is 2 mm. The encapsulation line 6 includes a plurality of short encapsulation lines 9 and a plurality of air release gaps 13 arranged alternately each other. The short encapsulation line 9 has the length of 40 mm and the width of 1 mm. The air release gap 13 has the length of 40 mm. The encapsulation line 6 is arranged in the partial-staggered manner, the directly communicated portions and the indirectly communicated portions formed by the air release gaps 13 are arranged alternately. The directly communicated portions formed by the air release gaps 13 each have the size of 2 mm along the length direction of the encapsulation line 6. At the same time, the membrane bag 1 at each corner 18 has three short encapsulation lines 9, one of which is parallel with one side of the membrane bag 1, and the other two of which are perpendicular to this side of the membrane bag 1. The short encapsulation line 9 which is parallel with one side of the membrane bag 1 is crossed perpendicularly with one of the other two short encapsulation lines which are perpendicular to the side of the membrane bag 1.

(3) The Preparation of the Core 117 pieces of positive plate assemblies 16 are prepared by the method described as (1), and 118 pieces of negative plate assemblies 17 are prepared by the method described as (2). A negative plate assembly 17 is first placed, and then a positive plate assembly 16 is laminated on the negative plate assembly 17, and so on, until all the negative plate assemblies 17 and the positive plate assemblies 16 are laminated alternately to form a core. During the process of forming the core, all the longer sides and the shorter sides of all the plate assemblies are in line respectively, and the positive conductive terminal 7 of the positive plate assembly 16 and the negative conductive terminal 8 of the negative plate assembly 17 are located at both sides of the same end of the positive plate 4 and the negative plate 5 respectively.

1500 cores are prepared by the above method. Having observed the cores, it can be seen that the cores have good flatness, and no curling of the membrane bags. This means that the cores of the present invention have good flatness.

Comparative Example 1

This comparative example shows the core in the prior art.

The core is prepared by the method in Example 1, except that there is only one loop of encapsulation line formed on each one of the membrane bags within which the positive plates and the negative plates are encapsulated respectively, there is no gap on the encapsulation line, and the width of the welding line which forms the encapsulation line is 3 mm.

1500 cores are prepared by the above method. Having observed the cores, it can be seen that the cores have bad flatness, and some membrane bags are curled.

Example 2

This example shows the mechanical impact resistance of the core of the present invention.

Any 500 cores taken out from the cores prepared in Example 1 are tested for the mechanical impact resistance, and the test method is as follows:

A steel plate having the length of 400 mm, the width of 300 mm and the thickness of 100 mm is placed horizontally on a flat cement ground, a core is placed horizontally on the steel plate, and then another steel plate having the length of 400 mm, the width of 300 mm and the thickness of 50 mm is placed on the core, such that the two surfaces of the core, which are parallel with the membrane bag, are contacted with the steel plates. And then, an impact force of 3920 N is applied onto the upper steel plate with the impact rate of 2 m/sec and the impacting times is once. The tested result is that the breaking rate of welding lines is zero.

Wherein, the breaking rate of welding lines=the number of membrane bags whose welding lines are broken/the total number of membrane bags×100%.

Comparative Example 2

This comparative example shows the mechanical impact resistance of the core in the prior art.

Any 500 cores taken out from the cores prepared in Comparative example 1 are tested for the mechanical impact resistance, and the test method is the same with that of Example 2. The tested result is that the breaking rate of welding lines is 15%.

From the comparison of Example 2 and Comparative example 2, it can be seen that the core of the present invention has better mechanical impact resistance.

Example 3

This example shows the air discharging performance of the core of the present invention.

A vernier caliper is used to measure the thicknesses of each one of another 500 cores prepared in Example 1, the result is that the average thickness of the 500 cores is 42.2 mm.

Comparative Example 3

This comparative example shows the air discharging performance of the core in the prior art.

A vernier caliper is used to measure the thicknesses of each one of another 500 cores prepared in Comparative example 1, the result is that the average thickness of the 500 cores is 44.3 mm.

From the comparison of Example 3 and Comparative example 3, it can be seen that the core of the present invention does not tend to be over-thick, and has good air discharging performance.

Example 4

This example shows the lithium ion battery of the present invention.

The lithium ion battery as shown in FIG. 8 is prepared.

The lithium ion battery comprises a core 3, a shell 10, a positive pole 11 and a negative pole 12.

A steel shell with the length of 230 mm, the width of 170 mm and the thickness of 40 mm is selected to be used as the shell 10. The core 3 prepared in Example 1 is placed into the space defined by the shell 10, The positive pole 11 and the negative pole 12, which are made of copper, are connected to one end cover of the shell 1 by bolt connection manner. The positive conductive terminal 7 and the negative conductive terminal 8 are connected to the positive pole 11 and the negative pole 12 by bolt connection manner, respectively. $LiPF_6$ is dissolved in a mixed solvent of EC/DMC=1:1 by the concentration of 1 mol/l to form a non aqueous electrolyte. This electrolyte is injected into the shell 10 by the amount of 6 g/Ah, and then the shell 10 is sealed to prepare the lithium ion battery.

300 batteries are prepared by the above method.

Comparative Example 4

This Comparative example shows the lithium ion battery in the prior art.

The lithium ion battery is prepared using the method in Example 4, except that the core used here is the core prepared in Comparative example 1.

300 batteries are prepared by the above method.

Example 5

This example shows the mechanical impact resistance of the lithium ion battery of the present invention.

The 300 batteries prepared in Example 4 are tested for the mechanical impact resistance, and the test method is as follows:

At the temperature of 25±2° C., each battery is charged at the current of 0.2 C and the cut-off current of 0.02 C to have the voltage of 3.8 volt, and is laid for 10 min; and then is discharged at the current of 0.2 C to have the voltage of 2.0 volt, and is laid for 20 min. And then, 100 batteries among them are taken out for pressing test, 100 batteries among them are taken out for impacting test, and 100 batteries among them are taken out for falling test. A multimeter is used to detect whether a short circuit is occurred in the battery before and after it is pressed, impacted and fell respectively.

1. Pressing

A steel plate having the length of 400 mm, the width of 300 mm and the thickness of 100 mm is placed horizontally on a flat cement ground; the battery is placed horizontally on the steel plate such that the surface of the battery, which is parallel with the membrane bag, is contacted with the steel plate. Then, a steel rod having the diameter of 30 mm and the length of 400 mm is placed horizontally on the middle part of the battery, such that the steel rod is parallel with the short sides of the battery. And then, a constant force of 294000 N is applied onto the steel rod to apply a pressing force to the battery, such that the battery is deformed by the pressing force to be 85% of its original size in the thickness direction thereof. After the battery is rested for 5 min, the force is applied again to press the battery, such that the battery is deformed further to be 50% of its original size. The rate of short circuit of the batteries after being pressed is listed in Table 1.

2. Impacting

The battery is placed horizontally on a flat cement ground with the surface of the battery, which is parallel with the membrane bag, contacted with the cement ground. Then, a steel rod having the diameter of 100 mm and the length of 150 mm is provided with its flat surface being registered with the middle portion of the battery, and then the steel rod falls down freely from a height of 690 mm onto the battery to impact the battery for one time. The rate of short circuit of the batteries after being impacted is listed in Table 1.

3. Falling

One time of falling test is performed to each of the other five surfaces of the battery (except the surface on which the pole is mounted). The test method is that the battery with a test surface being registered with a cement ground falls down from a height of 3 m onto the cement ground. The rate of short circuit of the batteries after falling down is listed in Table 1.

Wherein, the rate of short circuit of the batteries=the number of the batteries in which the short circuit is occurred/the total number of the tested batteries×100%.

Comparative Example 5

This Comparative example shows the mechanical impact resistance of the lithium ion battery in the prior art.

The 300 batteries prepared in Comparative example 4 are tested for the mechanical impact resistance, and the test method is the same with that used in Example 5. The rates of short circuit of the batteries after being pressed, being impacted and falling down are respectively listed in Table 1.

TABLE 1

| Example No. | The rate of short circuit of the batteries | | |
| --- | --- | --- | --- |
| | pressing | impacting | falling |
| Example 5 | 0 | 0 | 0 |
| Comparative example 5 | 2% | 1% | 3% |

It can be seen from the results in Table 1 that, the lithium ion battery of the present invention has better mechanical impact resistance, and is not easy to be short circuited when an unexpected force is applied thereto.

The invention claimed is:

1. An encapsulated electrode plate for a battery, comprising:
   an electrode plate with a rectangular periphery, the periphery comprising, in its two major dimensions, a top side, a bottom side and two sides; and
   a membrane that encapsulates the electrode plate, the membrane comprising two or more encapsulating loops along each side of the periphery of the electrode plate when the electrode plate is encapsulated, wherein the at least two encapsulating loops comprise an inner and an outer loop, and wherein the two or more encapsulating loops are in the same plane,
   wherein each encapsulating loop includes a plurality of air release gaps and the air release gaps on one encapsulating loop are staggered with the air release gaps on an adjacent encapsulating loop.

2. The encapsulated plate of claim 1, wherein the membrane comprises between 2 and 4 encapsulating loops in the same plane.

3. The encapsulated plate of claim 1, wherein the encapsulating loops along each side of the periphery in the same plane are substantially parallel to each other.

4. The encapsulated plate of claim 1, wherein the distance between adjacent encapsulating loops in the same plane is between about 0.1 and about 5 mm.

5. The encapsulated plate of claim 4, wherein the distance between adjacent encapsulating loops in the same plane is between about 1 and about 3 mm.

6. The encapsulated plate of claim 1, wherein at least some of the air release gaps on one encapsulating loop overlap with the air release gaps of an adjacent encapsulating loop.

7. The encapsulated plate of claim 6, wherein the overlap has a size of about 0.1-5 mm.

8. The encapsulated plate of claim 6, wherein the air release gaps comprise about 5-50 percent of each encapsulating loop.

9. The encapsulated plate of claim 1, wherein the plate has a corner; wherein the two or more encapsulating loops in the same plane are connected to each other at a corner of the plate.

10. The encapsulated plate of claim 1, wherein the encapsulating loops have a width of between about 0.3 and about 1.5 mm.

11. The encapsulated plate of claim 10, wherein the encapsulating loops have a width of between about 0.5 and about 1 mm.

12. The encapsulated plate of claim 1, wherein the plate comprises a conductive terminal protruding from the membrane.

13. The encapsulated plate of claim 1, wherein the membrane extends between about 2 and about 10 mm beyond each side of the periphery of the plate.

14. A core for a battery comprising a plurality of membrane encapsulated electrode plates, the encapsulated electrode plates comprising:
   a plurality of electrode plates, each with a rectangular periphery, the periphery comprising, in its two major dimensions, a top side, a bottom side, and two sides; and
   a membrane encapsulating each electrode plate, the membrane comprising two or more encapsulating loops along each side of the periphery of the electrode plate when the electrode plate is encapsulated, wherein the at least two encapsulating loops comprise an inner and an outer loop, and wherein the two or more encapsulating loops are in the same plane,
   wherein each encapsulating loop includes a plurality of air release gaps and the air release gaps on one encapsulating loop are staggered with the air release gaps on an adjacent encapsulating loop.

15. The core of claim 14, wherein the plurality of plates includes at least one positive plate.

16. The core of claim 14, wherein the plurality of plates includes at least one negative plate.

17. The core of claim 14, wherein the plurality of plates includes positive plates and negative plates arranged alternately.

18. A lithium ion battery, comprising:
   a core, comprising:
      a plurality of electrode plates, each with a rectangular periphery, the periphery comprising, in its two major dimensions, a top side, a bottom side, and two sides; and
      a membrane encapsulating each electrode plate, the membrane comprising two or more encapsulating loops along each side of the periphery of the electrode plate when the electrode plate is encapsulated, wherein the at least two encapsulating loops comprise an inner and an outer loop, and wherein the two or more encapsulating loops are in the same plane;
      wherein each encapsulating loop includes a plurality of air release gaps and the air release gaps on one encapsulating loop are staggered with the air release gaps on an adjacent encapsulating loop
   an electrolyte;
   a shell;
   a positive pole; and
   a negative pole.

19. A lithium ion battery of claim 18, wherein the core and the electrolyte are sealed within the shell.

20. A lithium ion battery of claim 18, wherein the positive pole and the negative pole are respectively disposed in the shell and connected to the core.

* * * * *